United States Patent

Coleman et al.

[11] Patent Number: 6,032,154
[45] Date of Patent: *Feb. 29, 2000

[54] DATA STORAGE AND MANAGEMENT SYSTEM FOR USE WITH A MULTIPLE PROTOCOL MANAGEMENT SYSTEM IN A DATA ACQUISITION SYSTEM

[76] Inventors: Robby A. Coleman, 39 Riverdale Estates, Winfield, W. Va. 25213; Dale E. Durham, 121 Village Dr., Scott Depot, W. Va. 25560

[*] Notice: This patent is subject to a terminal disclaimer.

[21] Appl. No.: 08/647,357

[22] Filed: May 9, 1996

[51] Int. Cl.[7] ........................................................ G06F 17/30
[52] U.S. Cl. ............................................. 707/104; 395/500
[58] Field of Search ........................................ 395/615, 504, 395/200.01, 500; 364/551.01, 200; 370/79; 340/147; 707/200, 104

[56] References Cited

U.S. PATENT DOCUMENTS

| | | | |
|---|---|---|---|
| 4,281,315 | 7/1981 | Bauer et al. | 340/147 |
| 4,742,467 | 5/1988 | Messerich et al. | 364/200 |
| 5,265,239 | 11/1993 | Ardolino | 395/504 |
| 5,345,396 | 9/1994 | Yamaguchi | 395/504 |
| 5,428,555 | 6/1995 | Starley et al. | 364/551.01 |
| 5,452,433 | 9/1995 | Nihart et al. | 395/504 |
| 5,490,134 | 2/1996 | Fernandes et al. | 370/79 |
| 5,515,508 | 5/1996 | Pettus et al. | 395/200.01 |
| 5,572,724 | 11/1996 | Watanabe et al. | 707/200 |
| 5,794,009 | 8/1998 | Coleman et al. | 395/500 |

FOREIGN PATENT DOCUMENTS

| | | | |
|---|---|---|---|
| 0463764A2 | 1/1992 | European Pat. Off. | G06F 9/46 |
| 463764A2 | 1/1992 | European Pat. Off. | 9/46 |

OTHER PUBLICATIONS

Microsoft Corporation, Microsoft Windows for Workgroups Resource KIt, Text Book, pp. 3–9, 1992.

*Primary Examiner*—Thomas G. Black
*Assistant Examiner*—Frantz Coby
*Attorney, Agent, or Firm*—David L. Davis

[57] ABSTRACT

A data acquisition system having a plurality of remote data gathering devices each of which communicates according to a respective defined communications protocol. An object database memory containing data for all of the data gathering devices is provided. Protocol drivers stored in the memory may be retrieved and stacked to form a layered protocol driver in accordance with established ISO/OSI standards. A common messaging interface is interposed between adjacent protocol drivers in the stack and a common database interface is interposed between the protocol drivers and the database memory.

7 Claims, 10 Drawing Sheets

Microfiche Appendix Included
(3 Microfiche, 214 Pages)

Folder ER Diagram

DATA STORAGE AND MANAGEMENT SYSTEM FOR USE WITH A MULTIPLE PROTOCOL MANAGEMENT SYSTEM IN A DATA ACQUISITION SYSTEM

CROSS-REFERENCE TO RELATED APPLICATION

This application is related to U.S. patent application Ser. No. 08/647,356, filed on even date herewith and assigned to the assignee of the present invention, now U.S. Pat. No. 5,794,009, issued Aug. 11, 1998.

MICROFICHE APPENDIX

This application contains a microfiche appendix consisting of 3 microfiche and 214 frames.

BACKGROUND OF THE INVENTION

This invention relates to a data acquisition system which has a plurality of remote data gathering devices each of which communicates according to a respective defined communications protocol and, more particularly, to a data storage and management system for use in such a data acquisition system.

Today's utilities have new and ever increasing demands being placed on their information systems. Deregulation, increasing customer service demands, improving efficiencies (such as "unaccounted for gas"), improving management of customer demand (such as load balancing) and downsizing pressures, force the utilities to find more efficient ways of collecting and managing their data in order to compete. These factors exponentially increase the need for timely and accurate operational data. Additionally, new Information Superhighway technologies are opening up a vast information resource between utilities and their customers.

Some of the system requirements becoming important to utilities include integration of existing information systems, use of open systems standards, communications with a multitude of devices, lower system installation and operating costs, scalability for future growth, and ease of use. These requirements also create a new set of challenges, such as databases which can maintain large historical and configuration information on hundreds or even thousands of devices, maintaining and implementing both proprietary and new device protocol standards, and applying open systems technologies to create integrated information systems.

A utility's information systems can be generally divided into the following categories:

Automated Mapping/Facilities Management (AM/FM);

Geographical Information System (GIS);

Electronic Measurement/Supervisory Control and Data Acquisition (EM/SCADA); and

Customer Information Systems/Financial Information Systems (CIS/FIS).

Utilities have invested vast amounts of money to develop these information systems and cannot afford to "start over". However, the new demands, as previously discussed, create an urgent need for cost effective technology that can utilize most of the prior information systems investments.

These requirements and challenges have generated a demand for new technology that integrates a utility's information sources and combines the strengths of both Electronic Measurement (EM) and Supervisory Control and Data Acquisition (SCADA) systems, while minimizing the weaknesses and limitations of each. A new technology emerging as a result of recent hardware and software advancements is being referred to as Distribution Automation (DA). DA synergizes the functionality, features, and characteristics of traditional EM and SCADA systems to provide a comprehensive automation and data management solution for local distribution utilities. Some of the characteristics of a DA system include:

Scalable, high-performance historical and configuration databases;

Highly distributed architecture;

Flexible communications systems;

Management of multi-vendor devices;

Open protocol development with support of smart devices (distributed intelligence);

Dynamic, easy to use graphical user interfaces;

Integrates easily with other information systems;

Uses advanced PC operating systems in place of traditional mainframes and minicomputers; and Incorporates characteristics of both traditional EM and SCADA systems.

The Information Superhighway (Iway) represents another driving factor for this new generation of Distribution Automation. The Iway is not just having a connection to the Internet. Several Iway type applications are currently in development which affect utility companies, including: direct access to customers for utilities through broadband networks, and consolidated energy management systems controlled by marketing companies with buying power. The new opportunities and demands opened up by Iway technologies actually obsolete many (if not all) traditional EM and SCADA systems. An Iway system is not just another meter reading technology; it is a wide open two-way communications link between utilities and their customers, creating a whole new world of business opportunities. Iway systems represent the most sophisticated use of Distribution Automation. The demands of an Iway system emphasize the characteristics and capabilities of Distribution Automation.

The growing use of Electronic Correctors has expanded the definition of a distributed system. Electronic Correctors provide true distributed intelligence, with local logic, historical, and auditing information at each site. A system comprised of several hundred or even a few thousand of these devices creates a tremendous logistical problem to deal with. The central host which maintains these devices must be able to manage each device's configuration data and bring back each device's historical and auditing information into a globally coherent database system, regardless of the type of device used in the field. It is then common for the utility to require at least a couple of years of on-line historical data (perhaps even to one-hour intervals) for all of the devices. System performance must also be maintained at all times for both user access and incoming data.

The value of the data obtained by a DA system can especially be realized if it can be exchanged with other information systems throughout the utility. For example, the Customer and Financial Information systems need accurate billing and usage data, and Facilities Management needs operational data. Open systems standards such as SQL (Structured Query Language) and ODBC (Microsoft Open Database Connectivity) are the basis for easy data exchange among diverse systems.

In order to minimize the cost of acquisition and maintenance while not jeopardizing the security of supply, utilities prefer to be able to purchase hardware, software, electronic measurement, RTUs and other SCADA devices from diverse manufacturers. Some devices are also better at certain functions than at others. However, despite the promise of protocol standards, there are a number of proprietary and "de-facto" standard protocols used throughout the industry. This diversity in communications makes the goal of mixing multi-vendor equipment difficult for the utility. There are systems on the market which support multiple protocols, however, this is usually at a penalty of reduced functionality. Traditional SCADA systems usually do not even provide a mechanism in their protocol systems to support intelligent devices which have their own configuration, auditing, and historical data. The results of many of the current protocol standards committees will produce new protocol implementations which are more robust than the traditional host systems have been designed to handle. These aspects prompt the need for a more robust open protocol development environment which supports easier integration of device protocols, including "smart" devices which support true distributed processing.

The demands of a DA system which have been discussed thus far would have traditionally prompted the use of a mainframe or minicomputer system. The nature of a DA system requires a tremendous amount of asynchronous activity, such as highly active communications and database systems. This type of computing can now be accomplished through the Client/Server architecture supported by newer operating systems such as NT, OS/2, and traditional UNIX. Operating systems like NT and OS/2 provide many of the advanced capabilities previously found only in UNIX and mainframe operating systems, but at a significantly lower cost to develop and maintain than the traditional systems. A DA system can now, therefore, be made affordable for the common Local Distribution Company (LDC), where previously only the large pipeline and LDC utilities could afford the expensive custom system solutions. The Client/Server technique also allows a system to be highly scalable to fit diverse needs. A network of personal computers running database and communication servers potentially has more computing and throughput power than an expensive mainframe system.

By incorporating characteristics found in traditional EM and SCADA systems, a DA system now has the edge to be used in diverse installations, where a mix of systems was previously required. Common components and features of a DA system sound like comparable EM and SCADA features: SQL database, communications server, protocol tool kit, object oriented Graphical User Interface, "real-time" database, historical data management, configuration management, recalculation of historical data, auditing, security, alarming, process graphics, trending, device management, etc. The big difference here is that these features and components should be closely integrated into a complete system to duplicate common EM and SCADA features while adding support for the new DA characteristics.

To better clarify how a DA system is different from traditional EM and SCADA systems, a discussion of EM and SCADA limitations is necessary. Considering the demands and challenges presented thus far, a number of problems arise in traditional EM and SCADA systems. SCADA systems are most noted for their fancy graphical user interfaces. However, the underlying architecture of SCADA often gets overshadowed by this pretty face. SCADA systems are typically based on a "real-time" database (RTDB) configured by points. Many SCADA systems have been designed for the factory floor, which would have a relatively small number of points as compared to the logistically large point counts required in a DA system. For example, a DA system with 500 devices and 25 operational parameters at each device requires 12,500 points. If each device can store 10,000 historical records (not uncommon), then the host system needs to support a minimum of 5 million rows of historical data (and more since the host would normally maintain more historical data than the remote devices). The math is easy, but this simple example is overwhelming for a SCADA system which is sold by the number of points. SCADA packages are presently not designed to easily manage or configure such a point count, which requires individual tag names and room in the memory based "real-time" database.

Protocol development in present SCADA packages also does not provide for the tremendous amount of historical and auditing data which can be generated by smart devices such as electronic correctors. SCADA packages offer access to diverse database engines. However, this is merely a cliff-hanger, since a database design for all of this data must be accomplished to meet the performance and storage needs of the system. This technique allows for a totally unique system for every utility, which translates to support headaches for both the utility and the system integrator. Again, much of this problem comes from the fact that many presently available SCADA systems primarily have focused on drawing tools and not the data management side of a system. Common SCADA packages on the market today are, essentially, a set of development tools. The idea of a DA system is to go beyond a set of development tools to provide a more robust environment ready to deal with the challenges we have presented here, much like the Microsoft Office suite is designed to incorporate solutions for common business applications. Some of the advantages a DA system borrows from a SCADA system include alarm handling, advanced graphics and control capabilities.

EM systems focus primarily on providing consumption data for billing purposes. Some of the characteristics of an EM system which would be considered as limitations in a DA system include: a focus primarily on read-only data translation; lack of device specific configuration capabilities; lack of modern object oriented graphics; lack of two-way capabilities if a low-end control site were to be used (such as a nomination control site); some older designs are not as scalable as the newer open systems designs; limitations on protocol development; and limited database storage capabilities. A DA system corrects these limitations while borrowing some EM system advantages such as historical recalculations, data validation, security and audit trails.

A properly designed DA system can take advantage of many proven technologies to provide an even more robust solution for the utility. For example, a properly selected client/server database system will provide full transaction processing for multiple users, automatic database recovery, on-line database backup, roll forward recovery, and scalability to manage hundreds or thousands of devices with several years of historical data without performance degradation.

A DA communications system should take advantage of ISO/OSI (International Standards Organization/Open Systems Interconnection) standards to allow open development of protocol drivers. By using the ISO/OSI standards, multiple protocols and media can be easily maintained in the system without modifying the DA system's architecture. Following these guidelines will also allow easier inclusion of more sophisticated protocols which are currently being defined by diverse standards committees (such as AGA, IEEE/AMRA SCC31, MMS Forum, IEA-60 Home Automation, and joint AMRA/ANSI/CCAC/IEEE working group on meter protocol). These protocols will have better support of the distributed systems architecture becoming prevalent through the use of "smart" devices (such as electronic correctors).

A DA system should incorporate advanced graphics and drag-and-drop techniques to make system management easier. Managing hundreds or thousands of devices (each with their own historical data, audit trails, alarms, configuration parameters, and other items) represents a significant data presentation challenge. Advanced dynamic object oriented graphics can be used to represent this data in the form of nested folders, tables, and notebooks (similar to OS/2's, the Mac's, and Win 95's object oriented user interfaces).

It is therefore a primary object of the present invention to provide a data acquisition system satisfying the foregoing requirements.

It is a more specific object of the present invention to provide a data storage and management system for such a data acquisition system so that data collected from remote data gathering devices can be stored in an efficient manner in a database which is expandable and scalable.

SUMMARY OF THE INVENTION

The foregoing and additional objects are attained in accordance with the principles of this invention by providing a data storage and management system for use with a data acquisition system including a plurality of remote data gathering devices, wherein each of the plurality of remote data gathering devices communicates according to a respective defined communications protocol. The data storage and management system comprises a machine having a memory containing an object database for storing information representing a plurality of device objects each associated with a respective data gathering device. Each device object includes at least one protocol stack defining the communications protocol of the respective data gathering device, at least one poll configuration defining the data to be retrieved from the respective data gathering device, and at least one device data folder defining the groups of data found within the respective data gathering device.

In accordance with an aspect of this invention, the database further contains information representing the history of the remote data gathering device and each device object further includes at least one device history which defines history objects for the respective data gathering device.

In accordance with another aspect of this invention, each protocol stack contains a respective ordered list of protocol drivers defined according to ISO/OSI protocol layering definitions.

In accordance with a further aspect of this invention, the database stores action data, parameter data and event data for each of the defined protocol drivers.

In accordance with yet another aspect of this invention, the database stores at least one folder containing a plurality of device objects.

BRIEF DESCRIPTION OF THE DRAWINGS

The foregoing will be more readily apparent upon reading the following description in conjunction with the drawings in which like elements in different figures thereof are identified by the same reference numeral and wherein.

BRIEF DESCRIPTION OF THE APPENDICES

The appendices included with this application were written as WINDOWS® HELP files to assist a system user in understanding the system operation and to develop specific protocol stacks. These appendices are as follows:

APPENDIX A provides an overview of the communications server;

APPENDIX B provides a description of tables in the SCADA database;

APPENDIX C describes tables in the Security database;

APPENDIX D describes tables in the Masters database;

APPENDIX E describes tables in the Audit database;

APPENDIX F describes tables in the Event database;

APPENDIX G describes tables in the History database;

APPENDIX H provides an overview of the Protocol Driver Definition, the Protocol Driver Implementation and the Protocol Driver Tool Kit; and APPENDIX I describes the Database Layer Application Programming Interface (API).

DETAILED DESCRIPTION

Figure 1:
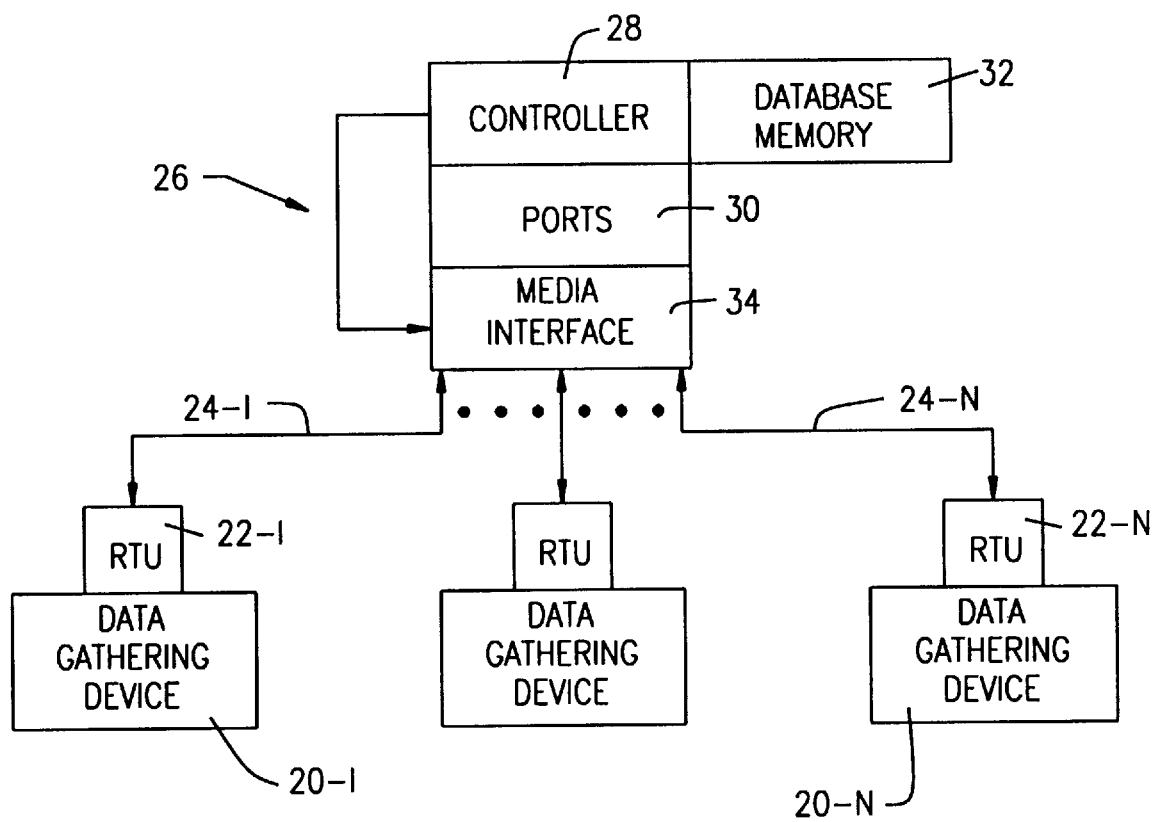
FIG. 1 is a block diagram of a data acquisition system in which a multiple protocol management system constructed in accordance with the principles of this invention is incorporated.

Referring now to the drawings, FIG. 1 shows a data acquisition system wherein a plurality of data gathering devices 20-1, . . . , 20-N, each with a respective remote terminal unit (RTU) 22-1, . . . , 22-N, are each connected via an appropriate communications medium 24-1, . . . , 24-N, to a central distribution automation system, designated generally by the reference numeral 26. The data gathering devices 20-1, . . . , 20-N may be any suitable device. In the case of a gas utility, such devices may be flow meters, electronic flow correctors, and the like. The communications media 24-1, . . . , 24-N may be dedicated wires, telephone lines, radio links, and the like.

The distribution automation system 26 includes a controller 28 having a plurality of communication ports 30, a database memory 32 associated with the controller 28, and a media interface 34 connected between the ports 30 and the communications media 24-1, . . . , 24-N, which is controlled by the controller 28 to establish a connection between a particular RTU 22-1, . . . , 22-N and a selected one of the ports 30.

Figure 2:
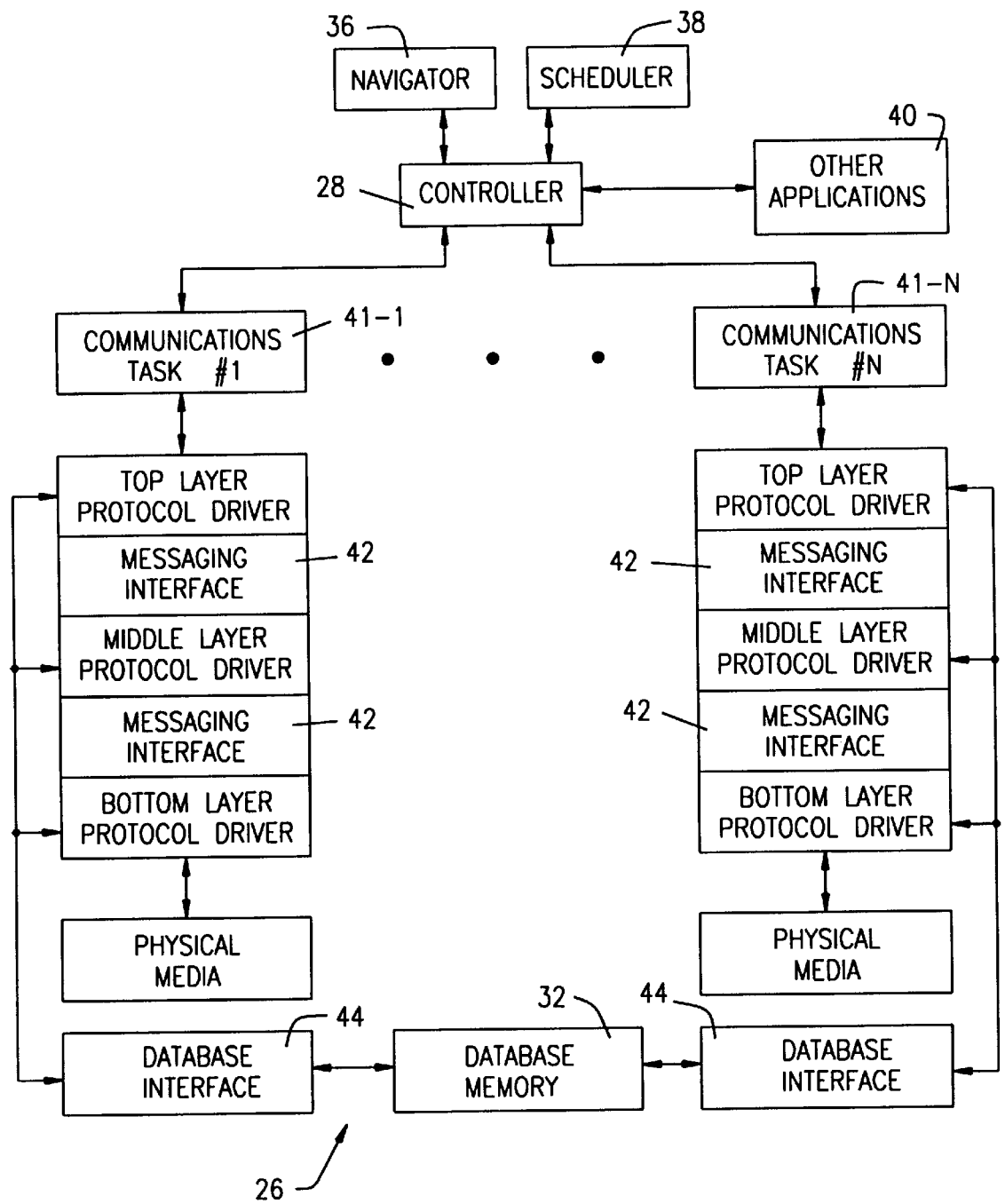
FIG. 2 is a conceptual hardware/software block diagram of the communications server incorporated in the system of FIG. 1.
Figure 3:
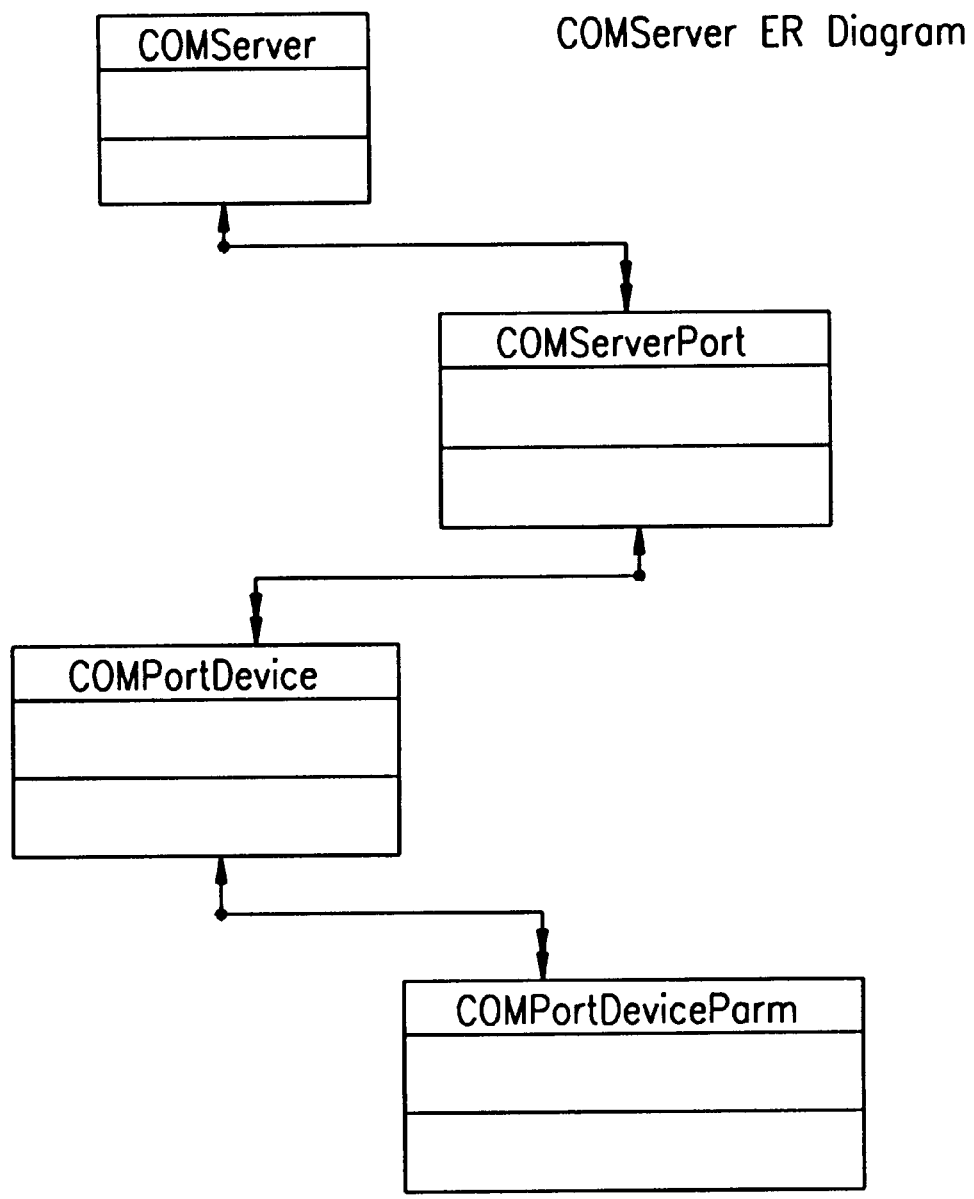
FIGS. 3–11 are exemplary entity relationship (ER) diagrams useful for understanding this invention.
Figure 4:
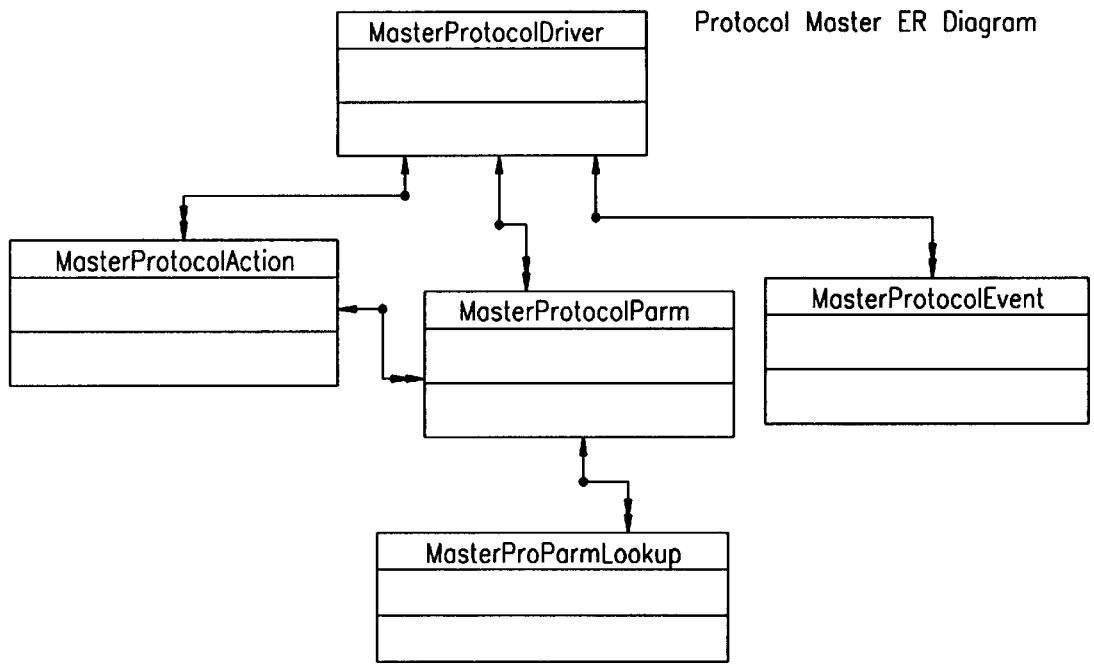
Figure 5:
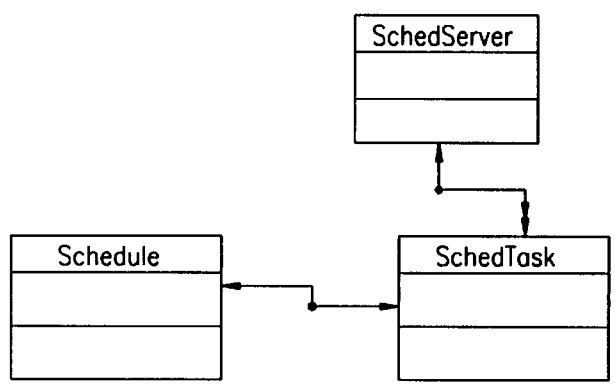
Figure 6:
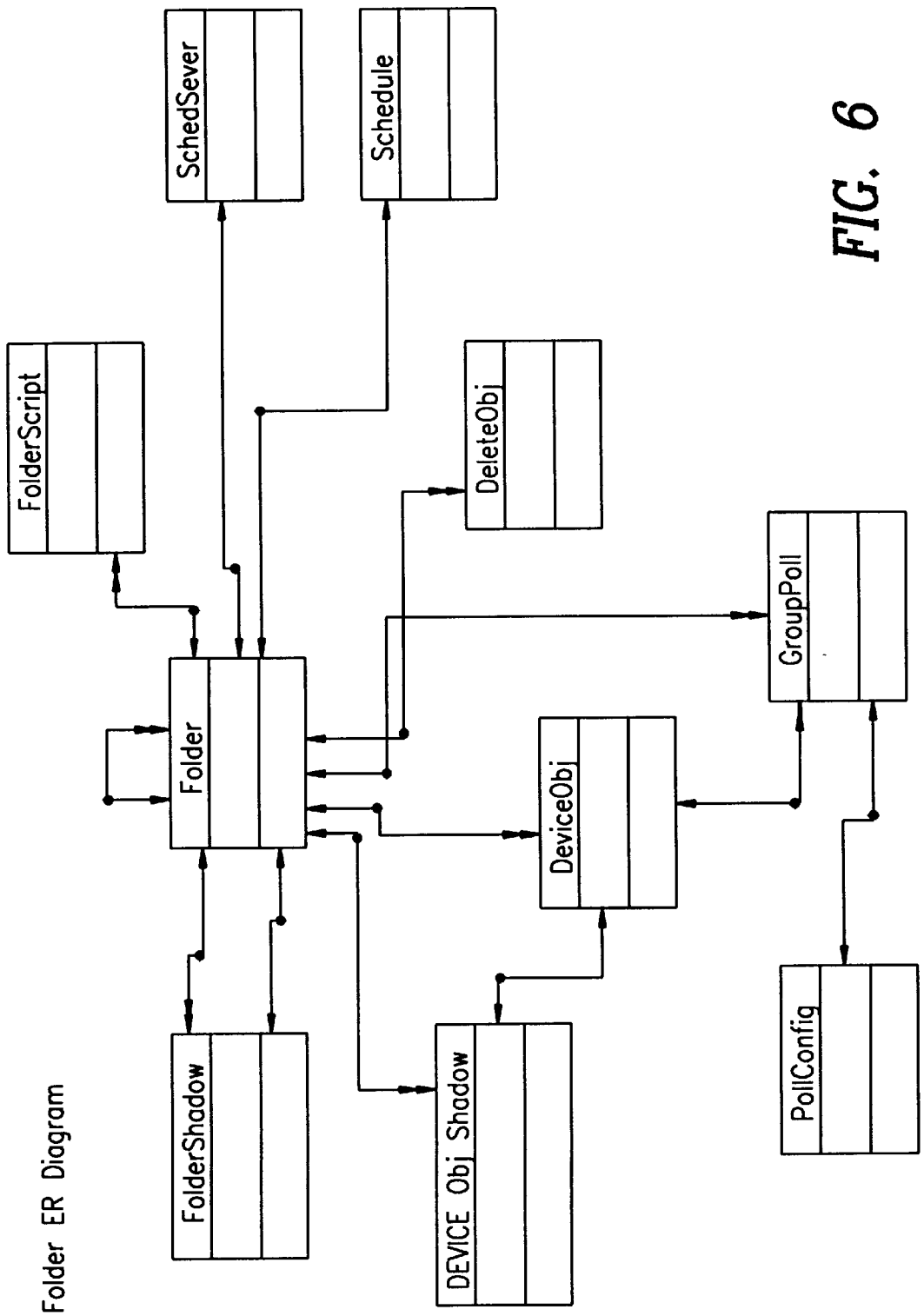

Referring to FIG. 2, shown therein is a conceptual hardware/software block diagram for the distribution automation system 26 of FIG. 1. As shown, the controller 28 receives commands, such as communications requests, from the Navigator application 36, the Scheduler application 38, or one of the other applications 40. These applications are computer-based, and may reside in the same computer as the controller 28 or in an independent free standing computer connected via a network. The Navigator 36 is under user control, includes a graphical user interface, and is preferably WINDOWS® based. By means of the Navigator 36, a user can obtain a reading from a specific one of the data gathering devices 20-1, . . . , 20-N (FIG. 1), and gain access to the database memory 32. The Scheduler 38 provides an automatic polling function to interrogate the data gathering devices 20-1, . . . , 20-N at regularly scheduled intervals and update the contents of the database memory 32. The other applications 40 may be developed by the user of the system to perform functions specific to that user.

The database memory 32 is organized as an object database. Illustratively, a commercially available object database, such as that offered by Objectivity/DB may be utilized. The database is organized into folders, objects, devices, points, etc., as understood in the art, and exemplary entity relationships for the database memory 32 are shown in FIGS. 3–11. By utilizing an object database as described, the database is readily expandable and scalable without any of the limitations inherent in a relational database. Thus, for example, history data of virtually unlimited size may be stored.

Figure 7:
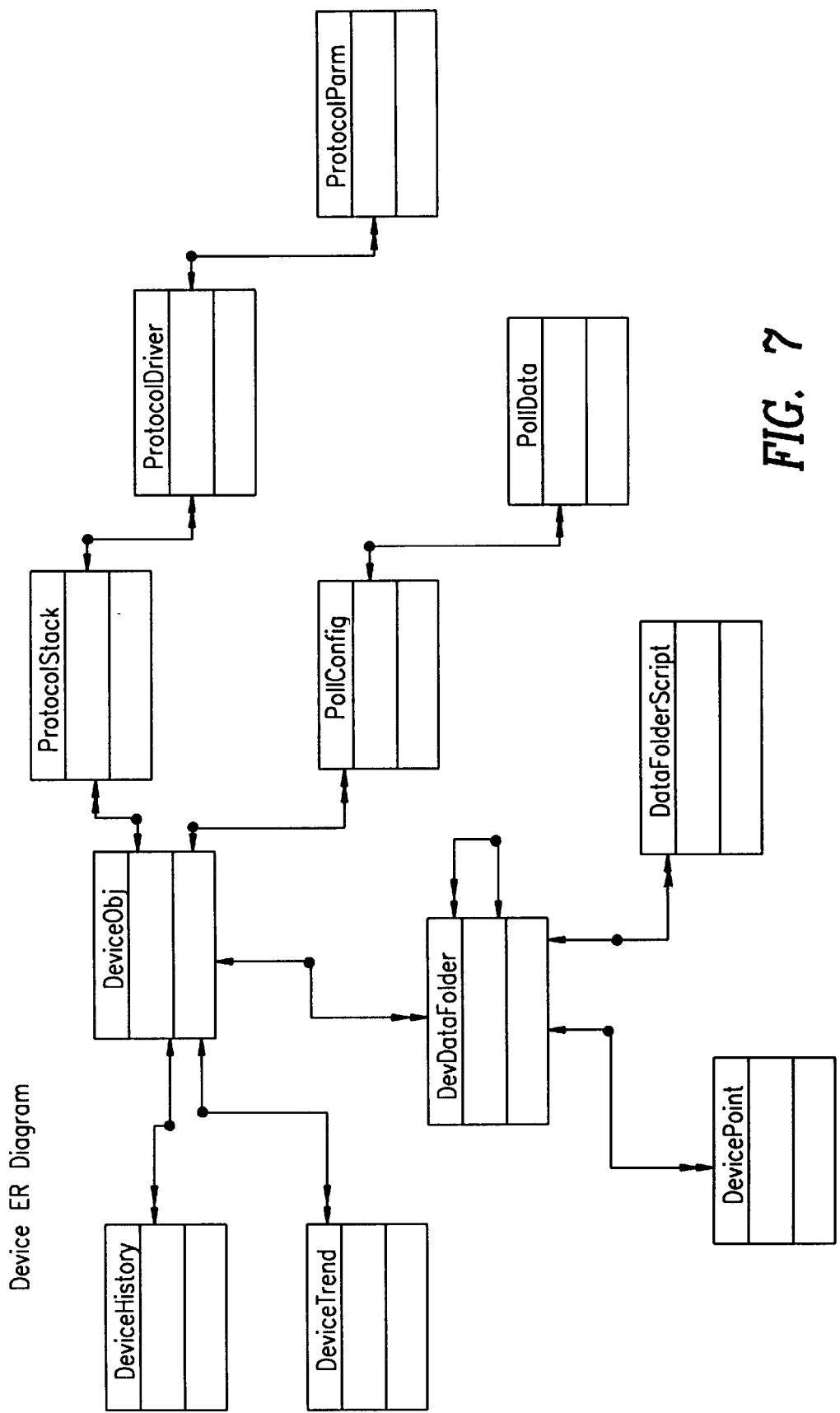
Figure 8:
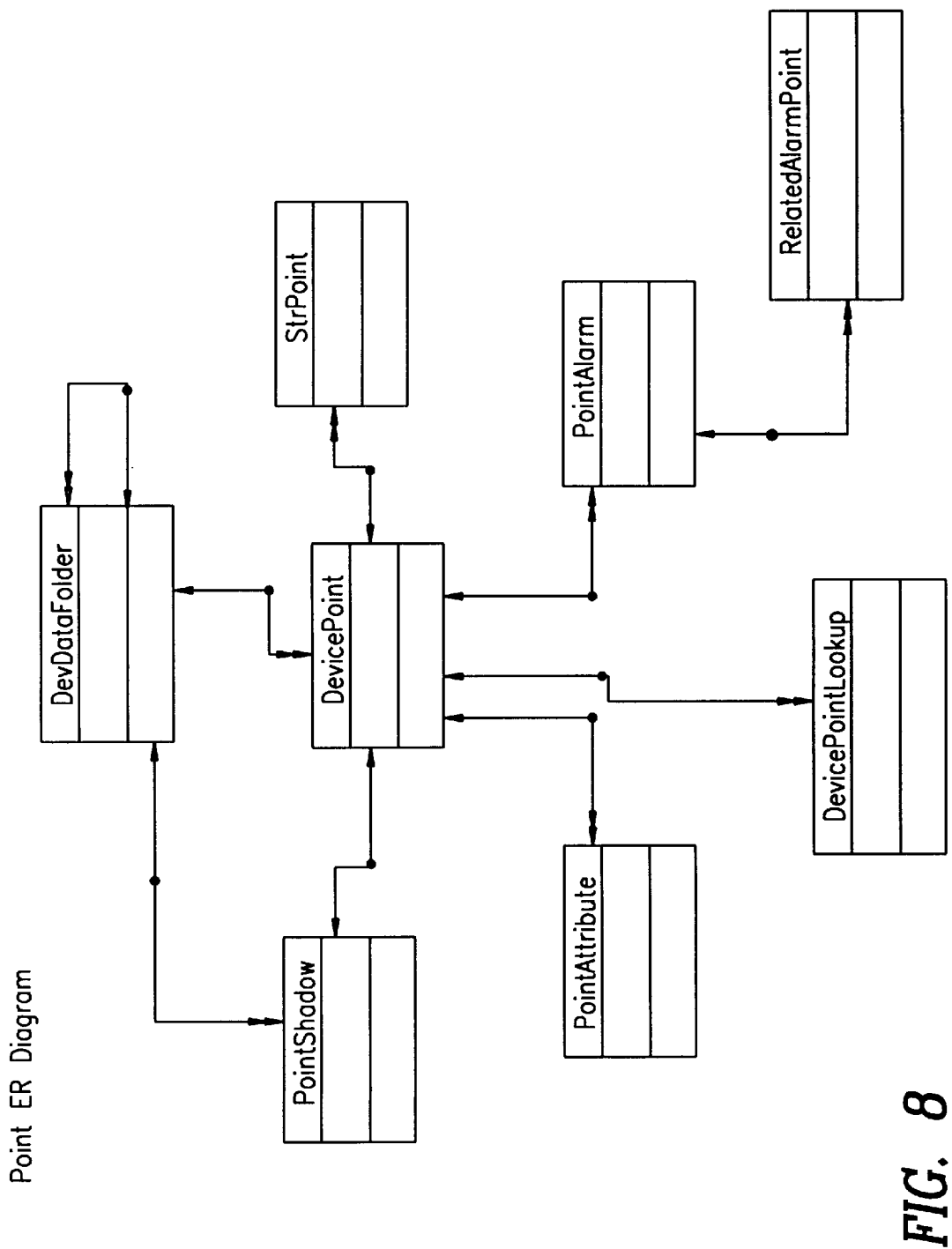
Figure 9:
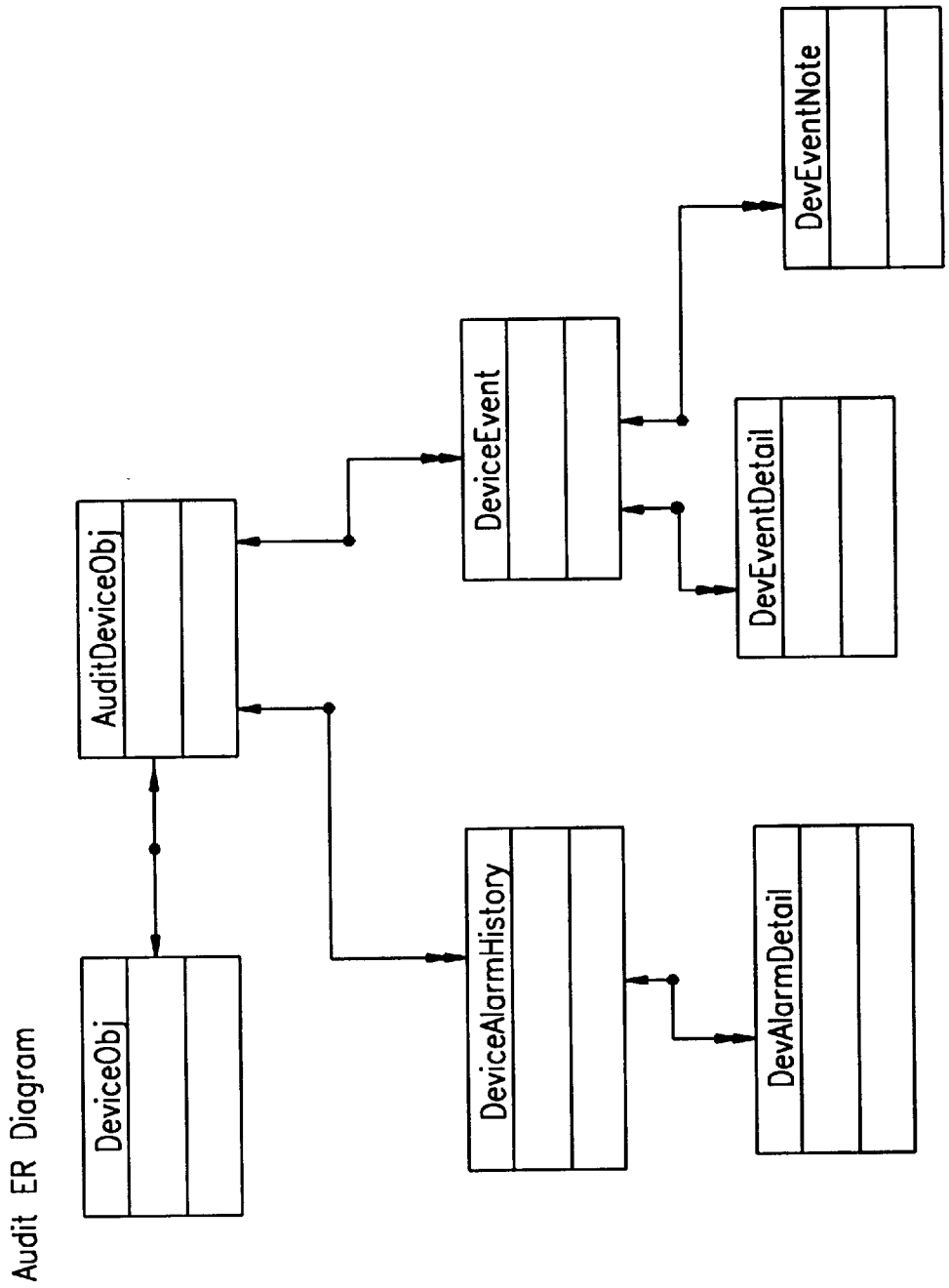
Figure 10:
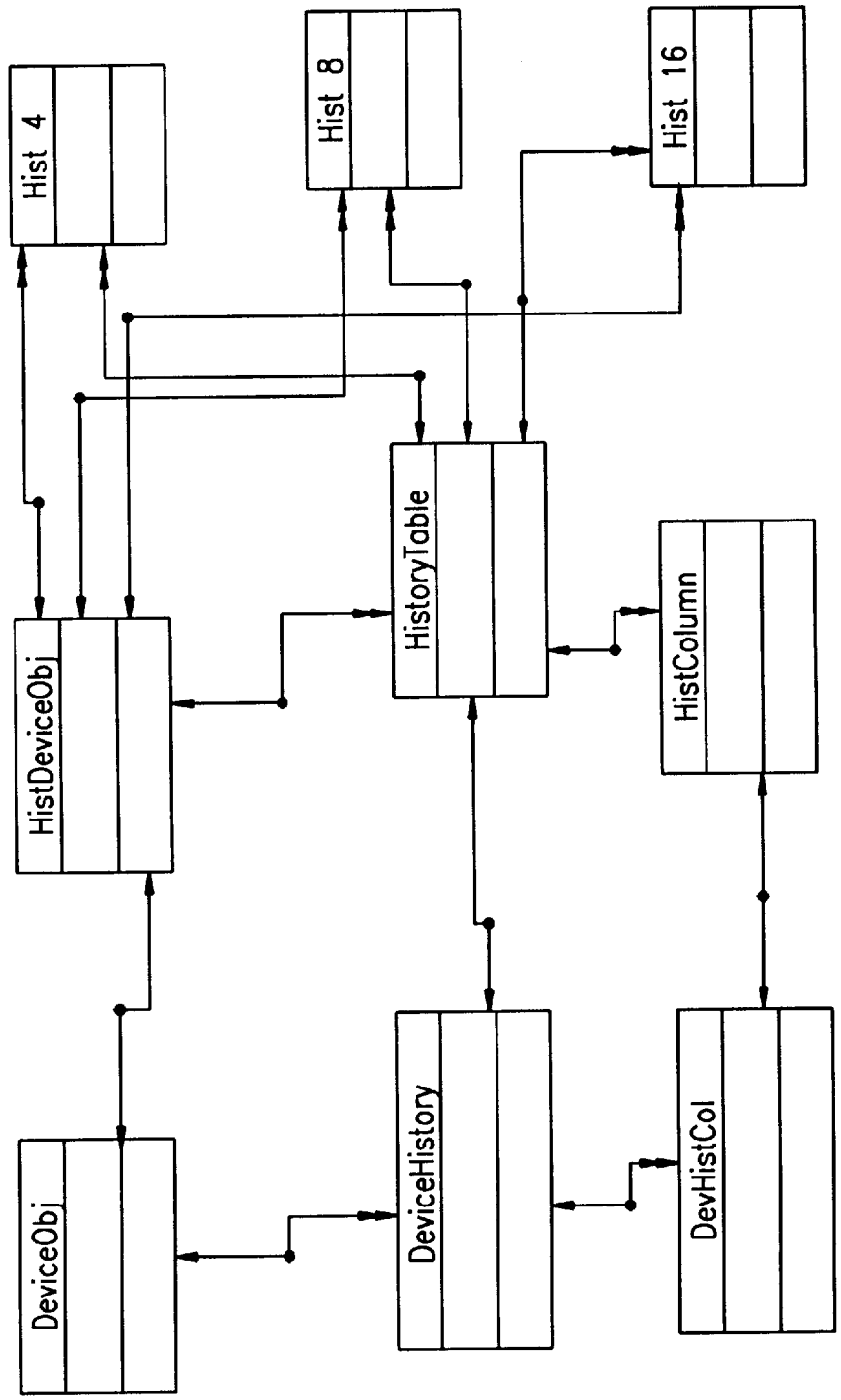
Figure 11:
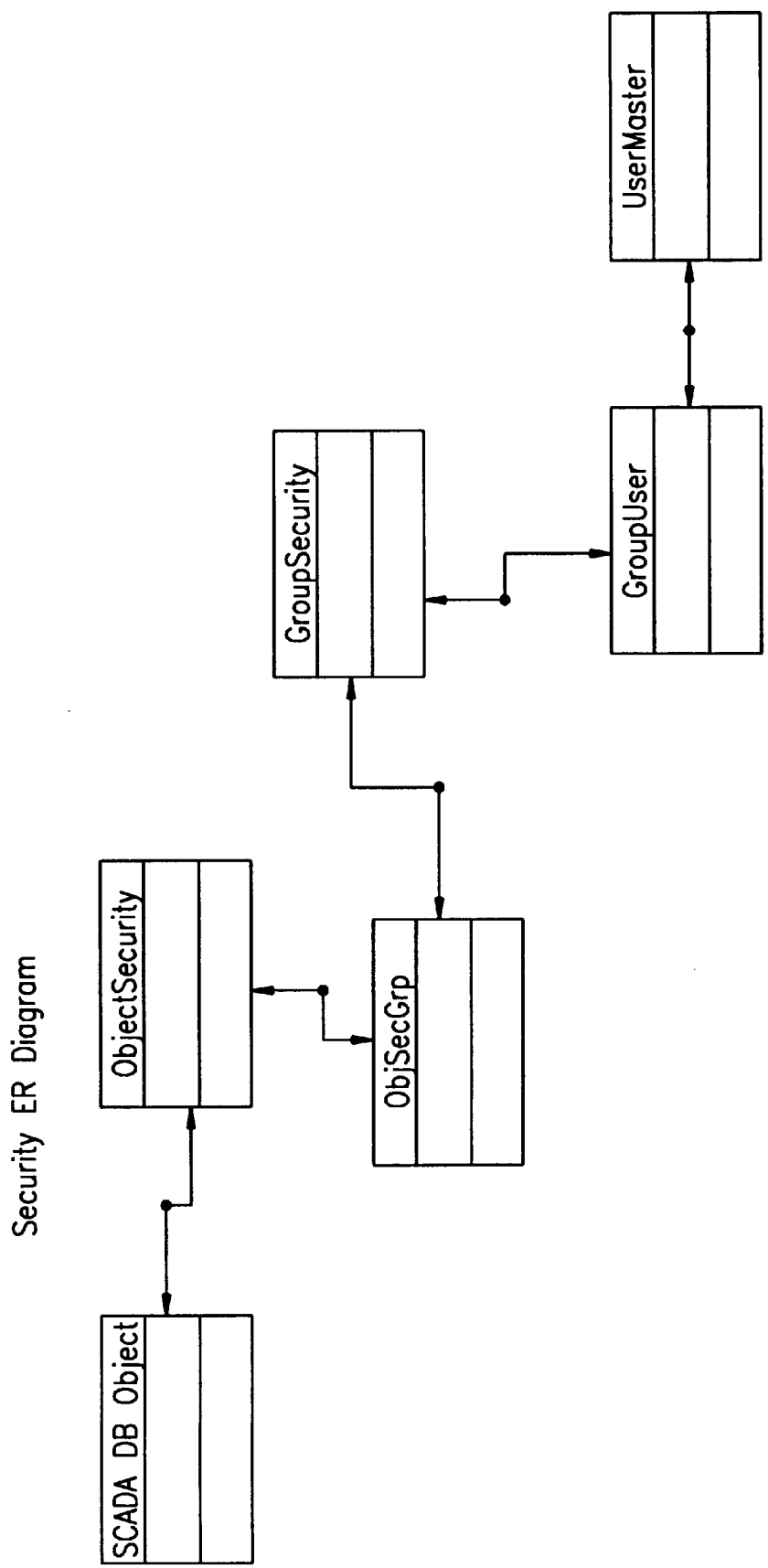

The memory 32 also stores the available protocol drivers. In accordance with established standards, such as International Standards Organization/Open Systems Interconnection (ISO/OSI) protocol drivers are stacked, or layered. The individual protocol drivers, which function as modular building blocks, are stored in the memory 32. Each of the RTUs 22-1, . . . , 22-N and its associated communication medium 24-1, . . . , 24-N has a predefined communications protocol for establishing communications. This communications protocol is stored in the memory 32, associated with the particular RTU, as an ordered list of protocol drivers which must be stacked to form the overall communications protocol. In addition, the database defines the data to be retrieved from the particular data gathering device (poll configuration), as well as the groups of data found within the device (device data folder) (FIG. 7).

When the controller 28 receives a communications request from one of the applications 36, 38, 40, it sets up a communications task 41-1, . . . , 41-N which it assigns to one of the ports 30. Based upon the identification of the specific RTU and communications medium and the associated ordered list stored in the database memory 32, the controller 28 establishes a stack of protocol drivers in accordance with the ISO/OSI standards. Each of the protocol drivers is implemented as a dynamic link library so that multiple stacks sharing common drivers can be utilized simultaneously. A universal message interface 42 is provided in each stack between adjacent protocol drivers (see APPENDIX H). The protocol drivers have access to the database memory 32 through a universal (common) database interface 44 (see APPENDIX I).

Under certain circumstances, an RTU 22 is associated with two or more defined communications protocol because, for example, it is coupled to two or more different communications media. In that case, the communications request will specify the particular communications protocol which is to be utilized, and the controller 28 will then set up the appropriate protocol driver stack.

In the memory 32, each of the protocol drivers has associated therewith a respective object which stores action data, parameter data and event data for that protocol driver.

The aforedescribed system can be configured as a distributed data acquisition network comprising a plurality of data acquisition systems each including a system as shown in FIG. 1 and associated with a respective set of data gathering devices.

Accordingly, there has been disclosed a data acquisition system which has a plurality of remote data gathering devices each of which communicates according to a respective defined communications protocol. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

What is claimed is:

1. A data storage and management system for use with a data acquisition system including a plurality of remote data gathering devices, each of the plurality of remote data gathering devices communicating according to a respective defined communications protocol, the data storage and management system comprising:

a machine having a memory containing an object database for storing information representing a plurality of device objects each associated with a respective data gathering device, each device object including:
(a) at least one protocol stack defining the communications protocol of the respective data gathering device;
(b) at least one poll configuration defining the data to be retrieved from the respective data gathering device; and
(c) at least one device data folder defining the groups of data found within the respective data gathering device.

2. The data storage and management system according to claim 1 wherein the database further contains information representing the history of the remote data gathering devices and each device object further includes at least one device history which defines history objects for the respective data gathering device.

3. The data storage and management system according to claim 1 wherein each of said at least one protocol stack contains a respective ordered list of protocol drivers defined according to ISO/OSI protocol layering definitions.

4. The data storage and management system according to claim 3 wherein the database stores action data, parameter data and event data for each of the defined protocol drivers.

5. The data storage and management system according to claim 1 wherein the database stores at least one folder containing a plurality of device objects.

6. The data storage and management system according to claim 1 wherein the database stores in each device object information characterizing the respective data gathering device, including its manufacturer and model type.

7. The data storage and management system according to claim 1 wherein the database stores for each device object an audit device object containing alarm and event information for the respective data gathering device.

* * * * *